US010423645B2

United States Patent
Bao et al.

(10) Patent No.: US 10,423,645 B2
(45) Date of Patent: Sep. 24, 2019

(54) SYSTEMS AND METHODS FOR CATEGORIZING CONTENT

(71) Applicant: Facebook, Inc., Menlo Park, CA (US)

(72) Inventors: Ling Bao, Redwood City, CA (US); Ryan David Landay, San Leandro, CA (US); Ravi Bhoraskar, Mountain View, CA (US); Bosmat Eldar, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 608 days.

(21) Appl. No.: 14/961,437

(22) Filed: Dec. 7, 2015

(65) Prior Publication Data

US 2017/0161357 A1 Jun. 8, 2017

(51) Int. Cl.
  G06F 16/28 (2019.01)
(52) U.S. Cl.
  CPC .................... G06F 16/285 (2019.01)
(58) Field of Classification Search
  CPC ............ G06F 17/30598; G06F 16/285; G06F 16/9535; G06F 16/24578; G06F 16/951; G06F 16/287; G06F 16/338
  USPC ........................ 707/738, 737, 728
  See application file for complete search history.

(56) References Cited

U.S. PATENT DOCUMENTS

| 8,271,495 | B1* | 9/2012 | Skrenta | G06F 17/30873 707/738 |
|---|---|---|---|---|
| 2009/0106307 | A1* | 4/2009 | Spivack | G06Q 30/02 |
| 2014/0115082 | A1* | 4/2014 | Korst | G06Q 30/02 709/206 |
| 2014/0136948 | A1* | 5/2014 | Miller | G06F 17/30887 715/234 |
| 2014/0344288 | A1* | 11/2014 | Evans | G06F 17/30867 707/749 |
| 2015/0142888 | A1* | 5/2015 | Browning | H04L 12/1831 709/204 |
| 2016/0055160 | A1 | 2/2016 | Himel et al. | |
| 2017/0076225 | A1* | 3/2017 | Zhang | G06N 99/005 |
| 2017/0097978 | A1* | 4/2017 | Gupta | G06F 17/30598 |

* cited by examiner

*Primary Examiner* — Dung K Chau
(74) *Attorney, Agent, or Firm* — Sheppard Mullin Richter & Hampton LLP

(57) ABSTRACT

Systems, methods, and non-transitory computer-readable media can determine at least one content item to be categorized, wherein the content item relates to a topic. The topic related to the content item can be determined. A set of categories can be determined based at least in part on the topic. A determination can be made that the content item corresponds to a first category in the set of categories. The content item can be associated with the first category, wherein the content item is included in a page corresponding to the topic within the first category.

20 Claims, 8 Drawing Sheets

SYSTEMS AND METHODS FOR CATEGORIZING CONTENT

FIELD OF THE INVENTION

The present technology relates to the field of content presentation. More particularly, the present technology relates to techniques for categorizing content items.

BACKGROUND

Today, people often utilize computing devices (or systems) for a wide variety of purposes. Users can operate their computing devices to, for example, interact with one another, create content, share information, and access information. In some instances, computing devices can be used to access various content items (e.g., images, videos, etc.), for example, that are provided through a page (e.g., web page, graphical user interface, etc.).

Under conventional approaches, a user can operate a computing device to access a page, for example, through a social networking system. The page can be associated with a topic that references a specific entity, point of interest, group, event, or item, to name some examples. In some instances, the page can include a number of content items that relate to the topic (e.g., entity, point of interest, event, item, etc.) corresponding to the page. Such content items may be provided, for example, by users of the social networking system.

For example, a page for a restaurant "Sushi Show" can include various images and videos that were taken at the restaurant. These content items may capture various aspects of the restaurant. The user can then view the content items to learn more about the restaurant. However, given that there may be any number of content items that are associated with a given page, it can be time consuming and otherwise problematic for the user to locate content items that capture a particular aspect of the restaurant.

SUMMARY

Various embodiments of the present disclosure can include systems, methods, and non-transitory computer readable media configured to determine at least one content item to be categorized, wherein the content item relates to a topic. The topic related to the content item can be determined. A set of categories can be determined based at least in part on the topic. A determination can be made that the content item corresponds to a first category in the set of categories. The content item can be associated with the first category, wherein the content item is included in a page corresponding to the topic within the first category.

In an embodiment, the topic can refer to an entity, a point of interest, a group, an event, a product, or item.

In an embodiment, the systems, methods, and non-transitory computer readable media are configured to determine that the content item is associated with at least one tag that describes the content item and determine the topic related to the content item based at least in part on the at least one tag.

In an embodiment, the systems, methods, and non-transitory computer readable media are configured to determine that the content item is associated with geolocation data that identifies a geographic location and determine the topic related to the content item based at least in part on the geolocation data.

In an embodiment, the systems, methods, and non-transitory computer readable media are configured to determine that the content item was captured by a user while being checked-in at a location and determine the topic related to the content item based at least in part on the location at which the user was checked-in.

In an embodiment, the systems, methods, and non-transitory computer readable media are configured to determine that the content item was provided through a page that corresponds to the topic.

In an embodiment, the systems, methods, and non-transitory computer readable media are configured to evaluate the content item using one or more content classifiers to determine the first category.

In an embodiment, the systems, methods, and non-transitory computer readable media are configured to receive a request to access the page corresponding to the topic and to provide the page corresponding to the topic, wherein the page includes a plurality of content items that are each categorized in a respective category, and wherein the plurality of content items includes the content item categorized in the first category.

In an embodiment, the systems, methods, and non-transitory computer readable media are configured to determine that the content item is incorrectly categorized in the first category based at least in part on user feedback and to remove the association between the content item and the first category.

In an embodiment, the systems, methods, and non-transitory computer readable media are configured to update one or more content classifiers based at least in part on the user feedback.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
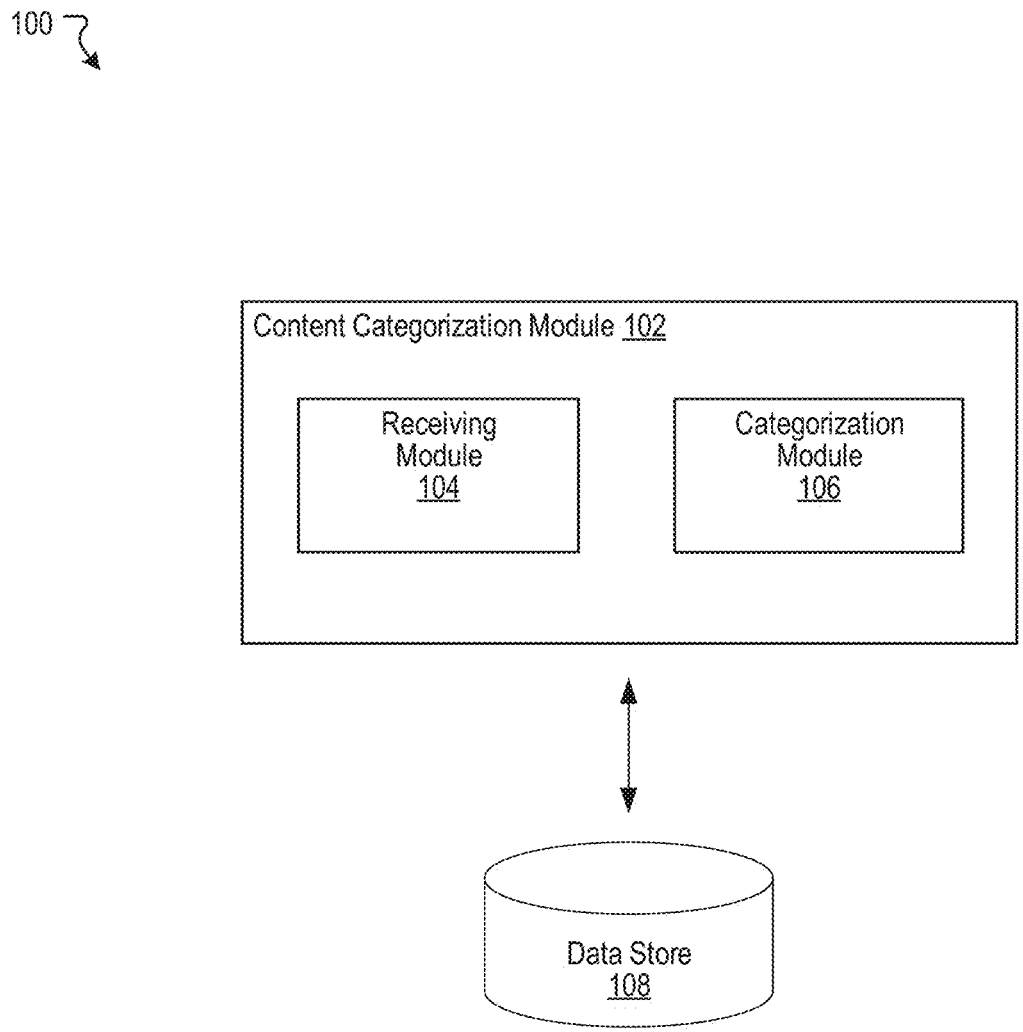
FIG. 1 illustrates an example system including an example content categorization module configured to categorize content items, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Categorizing Content Items

People use computing devices (or systems) for a wide variety of purposes. As mentioned, under conventional approaches, a user can operate a computing device to access content provided through pages (e.g., web page or graphical user interface). Such pages may be accessed through a website or through a social networking system, for example. Each page can be associated with a topic (or many topics). Further, the topic for a given page may correspond to a specific entity, point of interest, event, group, product, or item, to name some examples. Each page can include various information about the topic, including content items that relate to the topic. For example, a page for a restaurant "Bob's Burritos" can include information about the restaurant (e.g., operating hours, reviews, menu, etc.) as well as various images, videos, and/or audio taken at the restaurant. These content items may capture different aspects of the restaurant, such as the type of people that have dined at the restaurant, the type of food and/or drink served by the restaurant, or the interior and/or exterior features of the restaurant, to provide some examples. Given that there may be many content items that are provided through a given page, in some instances, it can be time consuming for the user to locate relevant content items that capture a particular aspect of the restaurant that may be of special interest to the user. For example, if the user is interested in viewing images that capture the ambiance of the restaurant (e.g., interior and/or exterior photos of the restaurant), the user would typically need to browse through all of the content items included in the page to find the content items of interest, including irrelevant content items that capture, for example, food and/or drinks served by the restaurant.

An improved approach overcomes the foregoing and other disadvantages associated with conventional approaches. In general, content items (e.g., images, video, audio, etc.) to be included in a page associated with a particular topic (e.g., entity, point of interest, group, event, product, item, etc.) can be categorized into one or more categories. In some embodiments, a content item can be categorized based at least in part on the subject matter captured by the content item. For example, an image of a pizza taken at a restaurant can be categorized in the "food" category. In another example, an image of people dining at the restaurant can be categorized in the "people" category. Such content items may be provided, for example, by entities that manage the page (e.g., a restaurant owner) or by various users that have visited the restaurant, such as users of a social networking system. For example, while accessing the page for the restaurant, users can be presented with an option to publically share their content items through the page. Content items that are shared by users can be accessed, or viewed, by other users that visit that page.

In some embodiments, the categories in which the content items included in a page are categorized can be determined based on the topic corresponding to the page. For example, the categories for a page corresponding to a restaurant can include "food," "drink," "interior," "exterior," or "people," to name some examples. A user accessing the page for the restaurant can select a respective tab corresponding to any of the categories (e.g., "food," "drink," "interior," "exterior," "people") to view content items that correspond to that category. For example, the user can select the "food" category tab to view images of the different types of food that are served by the restaurant. In another example, the user can select the "drink" category tab to view images and/or videos of the different types of drinks that are served by the restaurant. Similarly, the user can select the "interior" or "exterior" tabs to view images of the restaurant's interior or exterior ambiance. To view images of the types of people that dine at the restaurant, for example, the user can access the "people" tab. By utilizing such an approach, users can access specific categories of content items to easily locate content items that are of interest.

FIG. 1 illustrates an example system 100 including an example content categorization module 102 configured to categorize content items, according to an embodiment of the present disclosure. As shown in the example of FIG. 1, the content categorization module 102 can include a receiving module 104 and a categorization module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the content categorization module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content categorization module 102 can be implemented, in part or in whole, as software running on one or more computing devices or systems, such as on a user computing device or client computing system. For example, the content categorization module 102, or at least a portion thereof, can be implemented as or within an application (e.g., app), a program, or an applet, etc., running on a user computing device or a client computing system, such as the user device 710 of FIG. 7. Further, the content categorization module 102, or at least a portion thereof, can be implemented using one or more computing devices or systems that include one or more servers, such as network servers or cloud servers. In some instances, the content categorization module 102 can, in part or in whole, be implemented within or configured to operate in conjunction with a social networking system (or service), such as the social networking system 730 of FIG. 7. It should be understood that there can be many variations or other possibilities.

In various embodiments, the content categorization module 102 can be configured to categorize content items (e.g., images, video, audio, etc.) included in a page. As mentioned, each page can correspond to a particular topic, such as a specific entity, point of interest, event, group, product, or item, to provide some examples. The content categorization module 102 can determine the content items that are associated with the page, and can organize the content items into one or more categories. Each content item can be evaluated, for example, with respect to the content, or subject matter, that is captured by the content item, to determine the appropriate classification of the content item into one of the categories.

In some embodiments, a page can be associated with more than one topic. In such embodiments, the page can include categorized content items that correspond to each of the associated topics. For example, a page can correspond to both a point of interest and an event that is occurring at the point of interest. In this example, the page can include categorized content items that correspond to the associated topics. Depending on the implementation, the page can include a respective tab for each associated topic and, within the corresponding tab, the categorized content items associated with that topic.

The receiving module 104 can be configured to receive or obtain content items to be included in a page from various sources. For example, content items included in a page can be provided by entities that administer or manage the page. In one example, a page corresponding to a restaurant can be managed by the restaurant owner. The restaurant owner can provide various content items to be included in the page for the restaurant, such as images of the restaurant. In another example, a page corresponding to a point of interest, such as a museum, can be managed by a curator of the museum. Similarly, the curator can provide various content items to be included in the page for the museum. In some instances, content items in a page can be provided by users that have captured content (e.g., images, video, audio, etc.) relating to the topic corresponding to the page. In one example, a user that has taken photos at a particular restaurant can access the page corresponding to the restaurant, for example, through a social networking system, and can upload the photos to be included in the restaurant's page. In some instances, the receiving module 104 can be configured to obtain content items to be included in a page from other resources that provide content items that are associated, or grouped, with a specific topic.

The categorization module 106 can be configured to categorize the content items that are received, or obtained, for a given page into categories. In some implementations, each content item can be categorized into one category. However, other implementations can allow for content items to be categorized into more than one category. As mentioned, each page can correspond to a particular topic. In some embodiments, the categories used to classify the content items can be determined based on the topic to which the page corresponds. For example, the categories for a page corresponding to a restaurant can include "food," "drink," "interior," "exterior," and "people." In another example, the categories for a page corresponding to a city can include "landmarks," "museums," "food," "nightlife," and "people," to name some examples. The categorization module 106 can categorize content items, for example, by evaluating individual content items with respect to the content, or subject matter, that is captured by the content item. More details regarding the categorization module 106 will be provided below in reference to FIG. 2.

In some embodiments, the content categorization module 102 can be configured to communicate and/or operate with the at least one data store 108 in the example system 100. The at least one data store 108 can be configured to store and maintain various types of data. In various embodiments, the at least one data store 108 can store data relevant to function and operation of the content categorization module 102. One example of such data is various content items associated with respective pages and the topic (e.g., entity, point of interest, group, event, product, item, etc.) that corresponds to each page. In some implementations, the at least one data store 108 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. It should be appreciated that there can be many variations or other possibilities.

Figure 2:
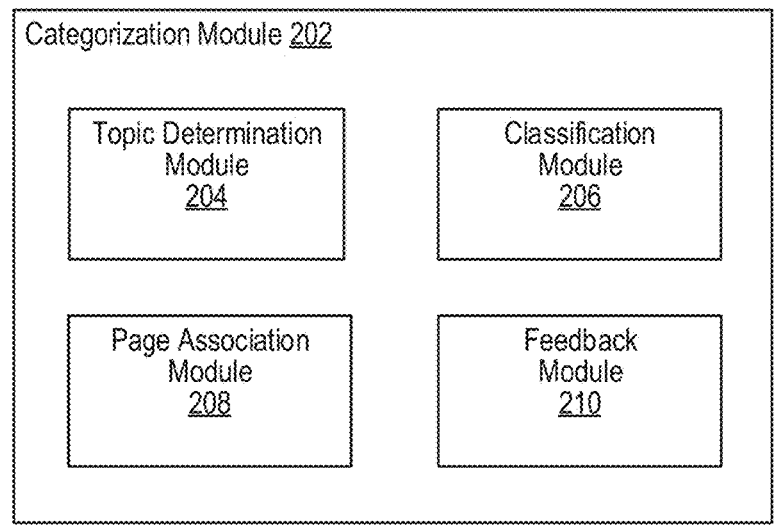
FIG. 2 illustrates an example categorization module configured to categorize content items, according to an embodiment of the present disclosure.

FIG. 2 illustrates an example categorization module 202 configured to categorize content items, according to an embodiment of the present disclosure. In some embodiments, the categorization module 102 of FIG. 1 can be implemented with the categorization module 202. As shown in the example of FIG. 2, the categorization module 202 can include a topic determination module 204, a classification module 206, a page association module 208, and a feedback module 210.

The topic determination module 204 can be configured to determine the topic to which a content item corresponds. A content item that corresponds to a particular topic can be accessed, or viewed, through a page for that topic, for example. Thus, for example, for a video that was taken by a user at a restaurant "Bob's Burritos," the topic determination module 204 can determine that the video relates to the topic "Bob's Burritos." In this example, when shared, the video can be publicly presented through a page for the restaurant "Bob's Burritos," thereby allowing other users to access the video through the restaurant's page.

In some embodiments, the topic determination module 204 can determine the topic to which a content item corresponds by evaluating any tags that are associated with the content item. For example, the content item may be associated with one or more tags, for example, by a computing device or by a user. Each tag can be made up of one or more terms that provide some description of the content item. In such embodiments, tags associated with a content item can be evaluated when determining topics to which the content item corresponds. For example, for an image that is associated with a tag "Bob's Burritos," a determination can be made that the image, based at least in part on the tag, relates to the restaurant "Bob's Burritos."

In some embodiments, content items to be categorized can be associated with data (e.g., GPS data) that specifies a geographic region in which the content item was created. For example, the image taken at the restaurant "Bob's Burritos" can be associated with data indicating that the image was captured at a geographic location that corresponds to the location of "Bob's Burritos." In such embodiments, the geographic data can be utilized to determine that the image relates to the restaurant "Bob's Burritos."

In some cases, the topic corresponding to a content item can be determined based on the context in which the content item was provided. For example, in some instances, while accessing a page corresponding to a particular topic, users can be presented with an option to publically share content items that relate to the page topic. In such instances, a user can select the option to submit, or upload, their content items to be shared. For example, a user may be accessing the page corresponding to the landmark "Golden Gate Bridge." In this example, the user can selection an option (e.g., a button)

to submit any of the user's content items that capture some aspect of the landmark. When the content items are submitted, the topic determination module 204 can determine that the content items were submitted through the page for the landmark "Golden Gate Bridge" and, based on this determination, the topic determination module 204 can determine that the submitted content items relate to the topic "Golden Gate Bridge." In some embodiments, content items that are submitted through a page are approved by an authorized entity (e.g., restaurant owner or entity managing the restaurant's page) before being made publically available through the page. Once approved, the user's content items can be accessed, or viewed, by other users that visit that page.

When accessing a page that corresponds to a topic, in some instances, users can be presented with an option to "check-in" at some geographic location that corresponds to the topic. Once a user selects the option to check-in, a notification may be provided, for example, to other users of a social networking system, indicating that the user has checked-in at the location. In some embodiments, any content items that are captured and/or submitted for sharing while the user is checked-in at a location that corresponds to a topic can be determined to correspond to the page for that topic.

The classification module 206 can be configured to perform a classification analysis on content items to determine the subject matter captured by the content items. The classification module 206 can perform the classification analysis by applying one or more machine learning models (e.g., content classifiers) to a content item. In particular, the classification module 206 can determine a probability regarding whether the content item reflects predetermined subject matter. The model can be based on any machine learning technique, including but not limited to a deep convolutional neural network.

In one example, the classification module 206 can analyze an image of a pizza taken at a restaurant and, based on the subject matter captured by the image, can generate, for each category in a set of categories, a respective probability indicating a likelihood that the subject matter of the image corresponds to the category. For example, a set of categories can include "food," "drink," "interior ambiance," "exterior ambiance," and "people." In this example, upon analyzing an image of a sandwich, the classification module 206 can generate, for each category in the set, a respective probability indicating a likelihood that the subject matter of the image corresponds to the category. Thus, for example, the image of the sandwich may have a probability of 0.95 for the "food" category, 0.44 for the "drink" category, 0.61 for the "interior ambiance" category, 0.22 for the "exterior ambiance" category, and 0.12 for the "people" category. Based on these example probabilities, the classification module 206 can determine that the image corresponds to the "food" category.

In some embodiments, the set of categories used for categorizing content items can be determined based on the topic to which a content item corresponds. For example, the categories used to classify a content item that relates to a restaurant (e.g., "Bob's Burritos") can include "food," "drink," "interior," "exterior," and "people." In another example, the categories used to classify a content item that relates to a city (e.g., "San Francisco") can include "landmarks," "museums," "food," "nightlife," and "people."

The model supported by the classification module 206 can be trained and tested to determine the subject matter reflected by a content item. For example, with respect to images, in a development phase, contextual cues for a sample set of images can be gathered. Images classes corresponding to various subject matter can be determined. Correlation of the sample set of images with the image classes based on the contextual cues can be determined. A training set of images can be generated from the sample set of images based on scores indicative of high correlation. The training set of images can be used to train the model to generate visual pattern templates of the image classes. In an evaluation phase, the model can be applied to a new image to determine the subject matter reflected by the new image.

The page association module 208 can be configured to associate content items with a page or pages. In some embodiments, content items can be associated with a page based at least in part on the topic to which the content item corresponds, as determined, for example, by the topic determination module 204. For example, a content item capturing some aspect of the restaurant "Bob's Burritos" can be associated with a page that corresponds to the restaurant "Bob's Burritos." As mentioned, content items included in a page can be categorized and accessed, or viewed, by users. In some embodiments, the page association module 208 can modify the order in which content items associated with a page are presented. For example, when a particular user accesses a page, the page association module 208 can order the presentation of content items, for any category, in that page by presenting content items that were provided by the user's social connections (e.g., "friends") before presenting other content items captured by third-party users that are not direct social connections of the user. In another example, the presentation of content items can be ordered by presenting content items that were captured recently (e.g., within some threshold period of time) before presenting older content items. Such filtering of content items may be based on the respective timestamps associated with the content items, for example. In another example, the presentation of content items can be ordered based on the number of user comments received by the respective content items in the page. For example, an image of the restaurant "Bob's Burritos" that received one or more comments (or likes) from users of a social networking system can be presented in the page before content items that did not receive any comments (or likes) from users. In some instances, the order in which content items are presented in a page can be determined based, in part, on the respective category classification probabilities, or confidence levels, for the content items. For example, if a first image has been categorized in the "food" category with a probability of 0.73 and a second image has also been categorized in the "food" category with a probability of 0.95, then the second image can be presented in the page before the first image, since the second image was determined to correspond to the "food" category with a higher confidence level.

The feedback module 210 can be configured to obtain feedback from users indicating whether a content item has, or has not, been correctly categorized for a given page. For example, if an image of the Golden Gate Bridge was categorized in the "food" category within the page corresponding to the restaurant "Bob's Burritos," then users can have the option to flag, or submit feedback, indicating that the image was incorrectly categorized. Such feedback can be used, for example, to refine the categorization module 202, including any machine learning models or classifiers that are used to categorize content items.

Figure 3:
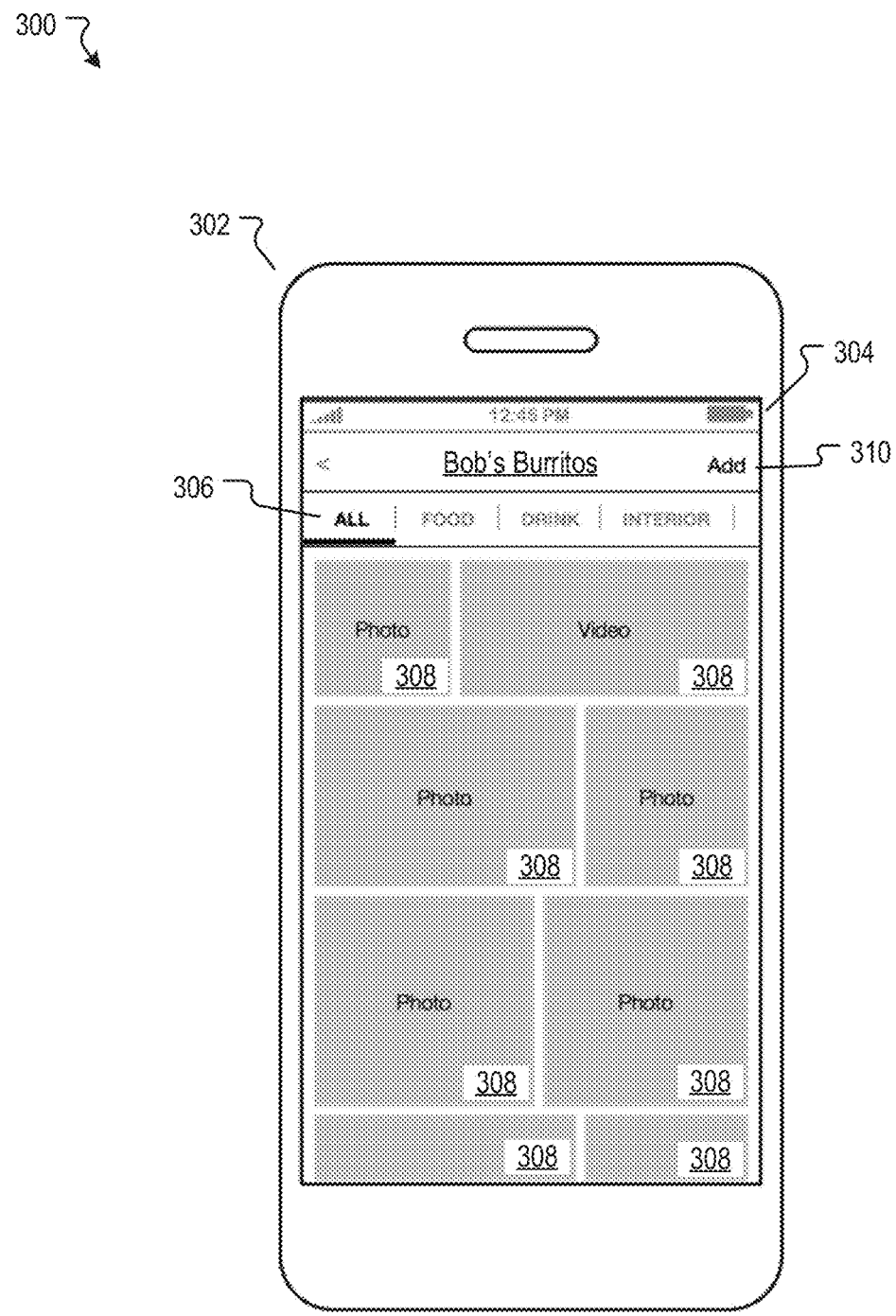
FIG. 3 illustrates an example of an interface for presenting categorized content items, according to an embodiment of the present disclosure.

FIG. 3 illustrates an example 300 of a page 304 (or other interface) for presenting categorized content items 308 (e.g., photos, videos, audio, etc.) that relate to a particular topic, according to an embodiment of the present disclosure. As shown, the page 304 may be accessed through a computing device 302, such as a mobile phone. In the example of FIG. 3, the page 304 corresponds to the restaurant "Bob's Burritos" and can include any content items 308 that relate to the restaurant.

Such content items 308 can include photos, videos, audio, etc., that capture some aspect of the restaurant. Further, the page 304 can include a number of different categories 306 (e.g., "All," "Food," "Drink," "Interior," etc.) within which the content items 308 can be categorized. In the example of FIG. 3, any of the categories 306 can be selected to access, or view, content items that have been determined to correspond to that category based at least in part on the respective subject matter of the content items. A user accessing the page 304 can select an option 310 (e.g., "Add") to submit additional content items to be included in the page 304.

Figure 4:
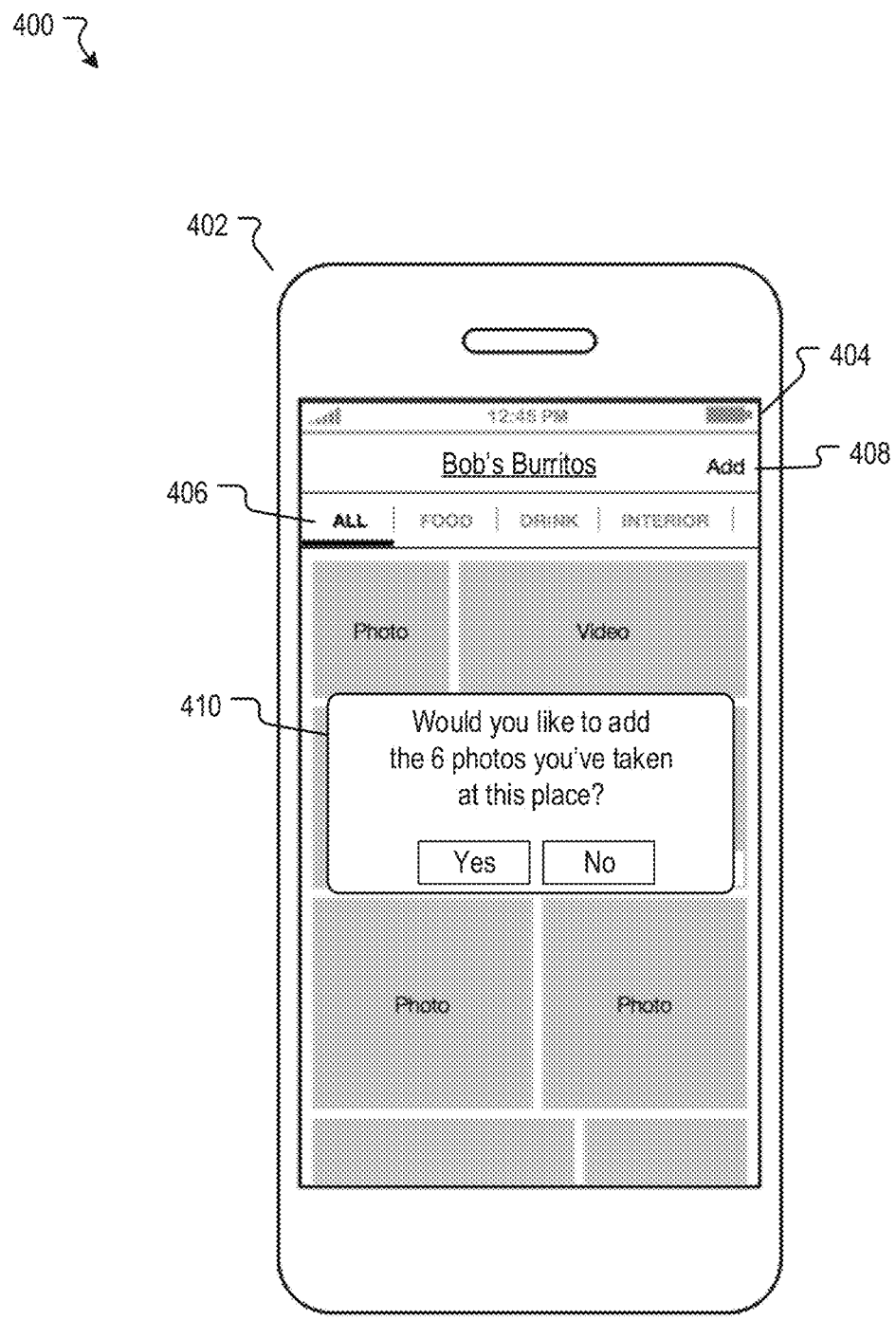
FIG. 4 illustrates an example of an interface for submitting content items to be categorized, according to various embodiments of the present disclosure.

FIG. 4 illustrates an example 400 of a page 404 (or other interface) for submitting content items that relate to a particular topic to be categorized and presented in the page 404, according to various embodiments of the present disclosure. The page 404 may be accessed through a computing device 402, such as a mobile phone. In the example of FIG. 4, the page 404 corresponds to the restaurant "Bob's Burritos" and can include any content items that relate to the restaurant. Further, the page 404 can include a number of different categories 406 (e.g., "All," "Food," "Drink," "Interior," etc.) within which the content items can be categorized.

As mentioned, in some embodiments, users accessing the page 404 can submit content items to be included in the page 404. The content items to be added may be submitted, for example, by selecting an option 408. In some embodiments, a user can be sent a notification 410 (e.g., pop-up notification) asking if the user would like to submit, for sharing, the content items that they have taken while at the restaurant "Bob's Burritos." If the user agrees to submit the content items, the content items can be uploaded, for example, to a social networking system and can be included in the page 404 for other users to access.

Figure 5:
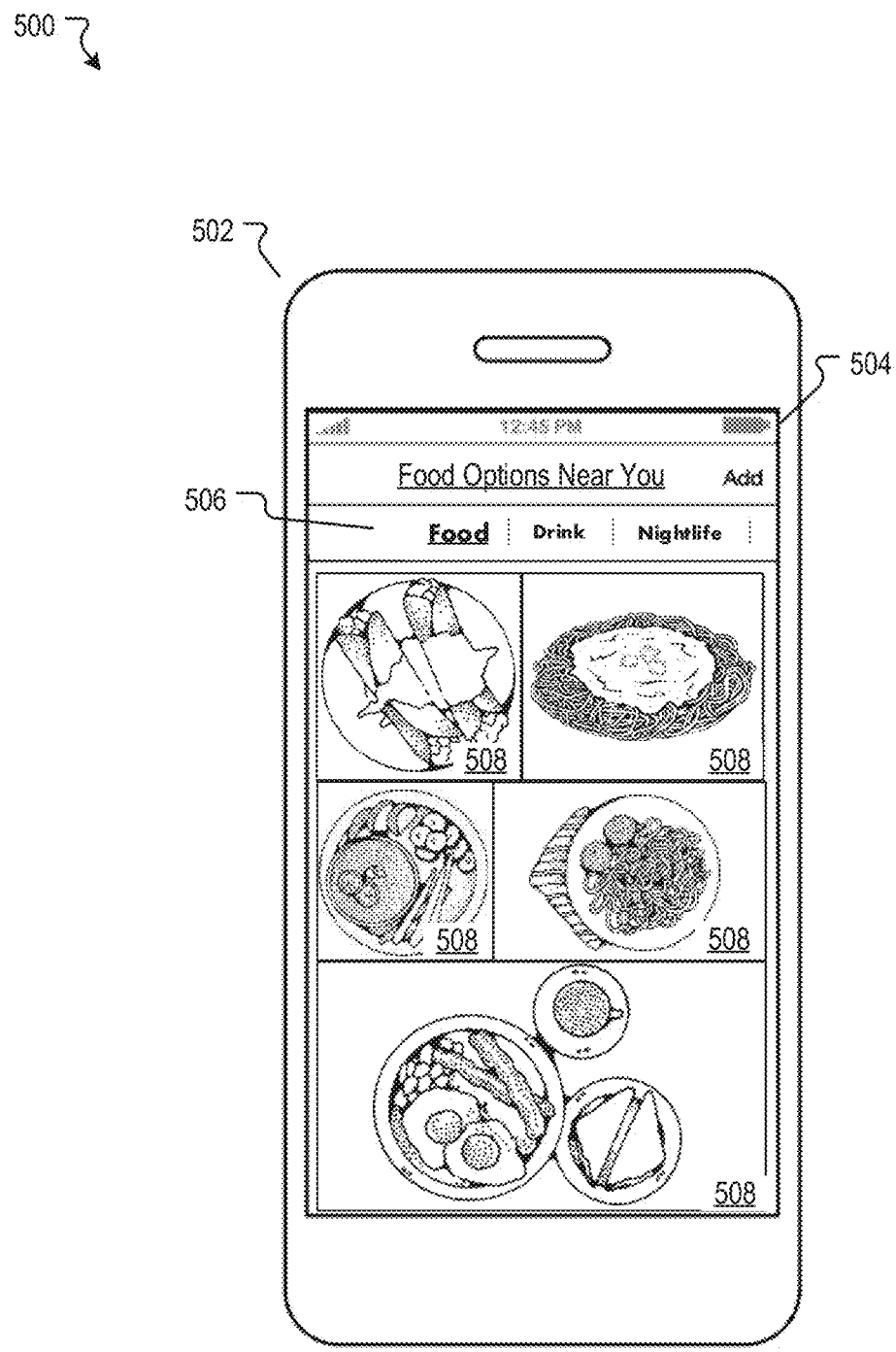
FIG. 5 illustrates an example of an interface for selecting establishments to visit, according to various embodiments of the present disclosure.

FIG. 5 illustrates an example 500 of a page 504 (or other interface) for selecting establishments to visit, according to various embodiments of the present disclosure. The page 504 may be accessed through a computing device 502, such as a mobile phone. In the example of FIG. 5, the page 504 includes categorized content items 508 that correspond to various establishments (e.g., restaurants) that are nearby or within some specified distance from a geographic location of the computing device 502. For example, the content items 508 can be presented in response to a user operating the computing device 502 selecting the "food" category 506. Each of the content items 508 can correspond to a type of food that is available at an establishment. The user operating the computing device 502 can access the page 504 to inform selection of an establishment to dine based on, for example, images or videos of the type of food being offered.

When a content item 508 is selected, a page for the establishment (e.g., restaurant) that serves that dish can be presented. The page can include various information about the establishment, or restaurant, along with additional content items relating to that establishment which have been categorized into a set of categories (e.g., "food," "drink," "interior," "exterior," "people," etc.). Similarly, the user operating the computing device 502 can select a different category 506 to view content items that correspond to that category. For example, upon selecting the "drink" category, content items corresponding to drinks served by nearby establishments can be presented.

Figure 6:
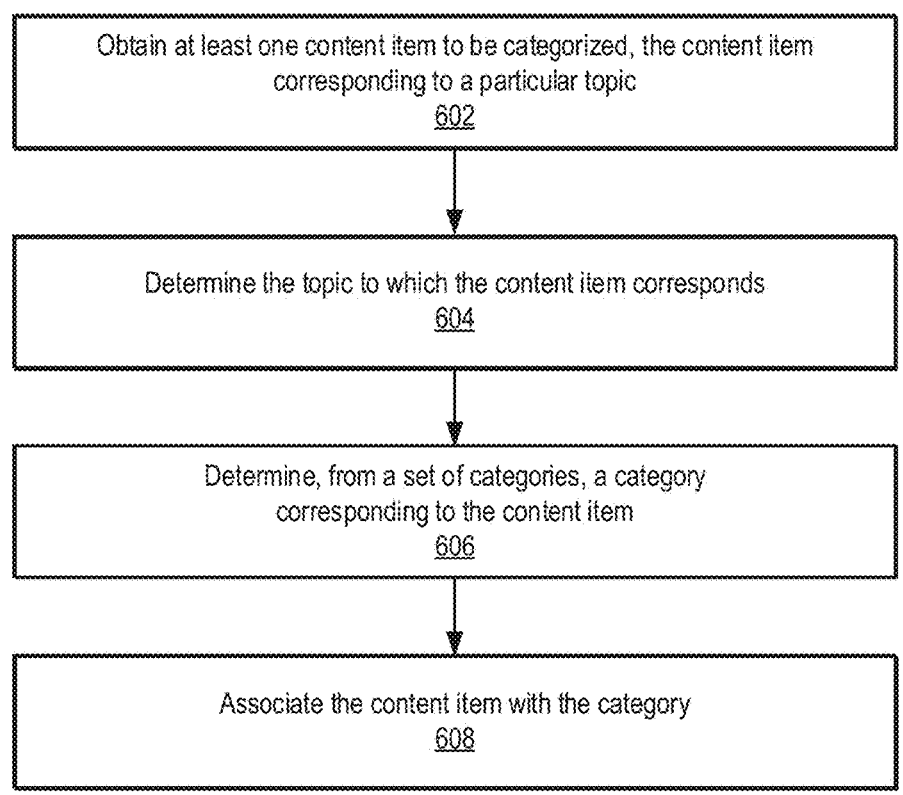
FIG. 6 illustrates an example method for categorizing content items, according to an embodiment of the present disclosure.

FIG. 6 illustrates an example method for categorizing content items, according to an embodiment of the present disclosure. It should be appreciated that there can be additional, fewer, or alternative steps performed in similar or alternative orders, or in parallel, within the scope of the various embodiments discussed herein unless otherwise stated.

At block 602, the example method 600 can obtain a content item to be categorized. The content item can relate, or correspond, to a topic. At block 604, the method 600 can determine the topic to which the content item corresponds, as described above. For example, the topic may refer to an entity, point of interest, group, event, product, item, etc. At block 606, the method 600 can determine, from a set of categories, a category corresponding to the content item. In some embodiments, the set of categories are based on the topic to which the content item corresponds. At block 608, the method 600 can associate the content item with the category. The content item can be presented, for example, in a page corresponding to the topic as part of other content items that have also been categorized in the same category.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
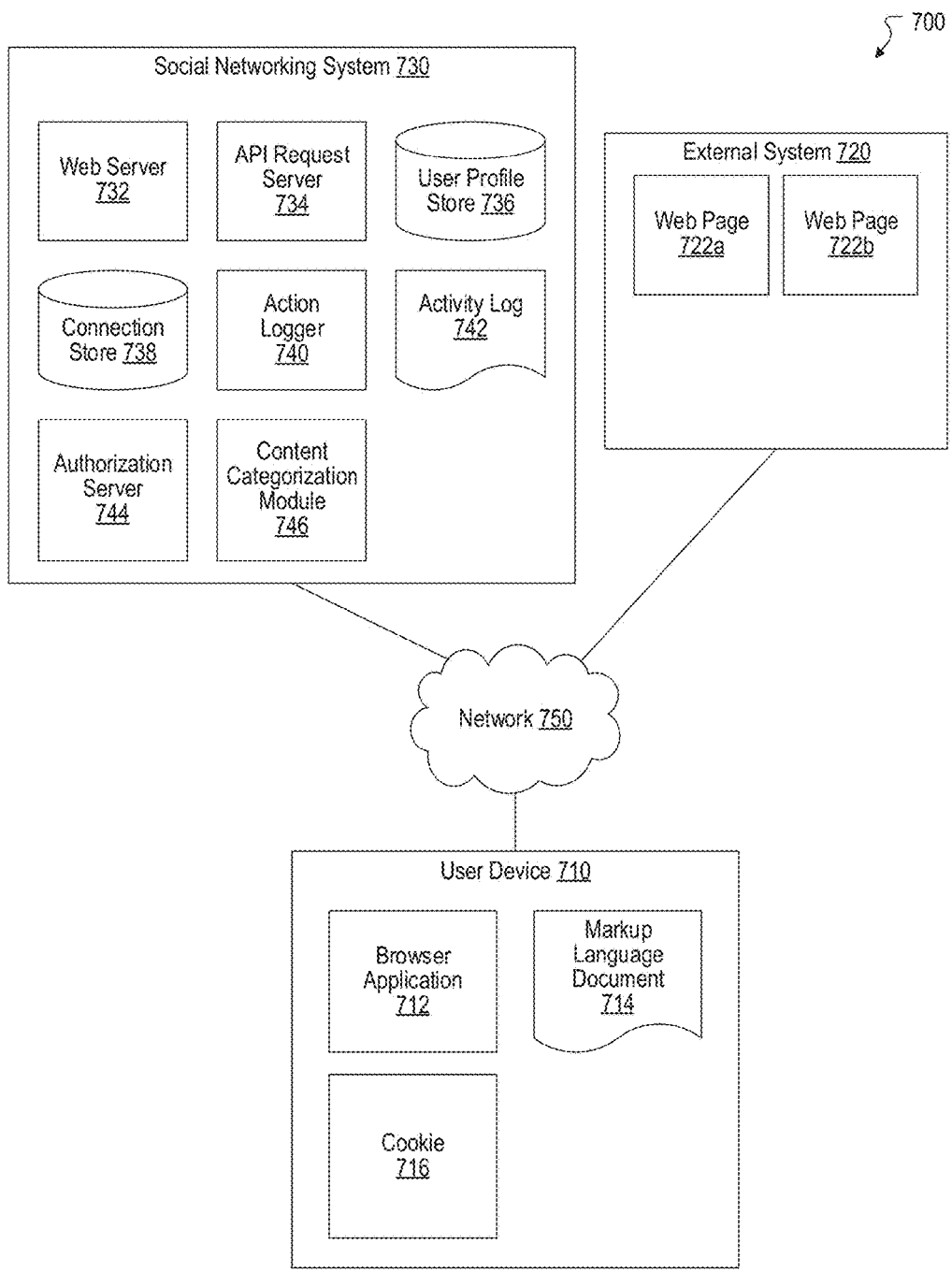
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722*a*, 722*b*, which are communicated to the user device 710 using the network 750. The external system 720 is separate from the social networking system 730. For example, the external system 720 is associated with a first domain, while the social networking system 730 is associated with a separate social networking domain. Web pages 722*a*, 722*b*, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722*a* within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a content categorization module 746. The content categorization module 746 can, for example, be implemented as the content categorization module 102 of FIG. 1. As discussed previously, it should be appreciated that there can be many variations or other possibilities.

Hardware Implementation

Figure 8:
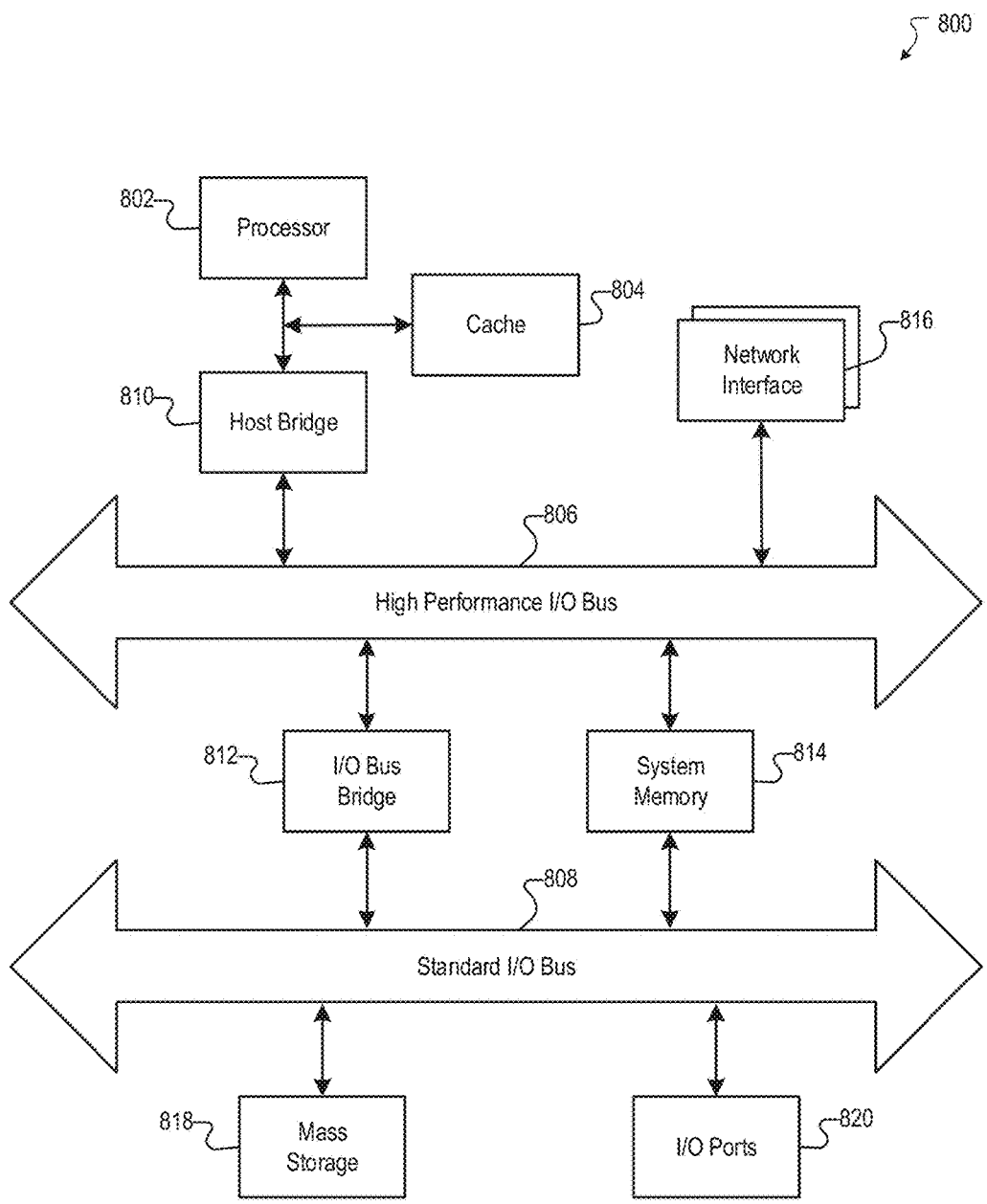
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a content item to be categorized and a topic related to the content item;
   determining, by the computing system, a set of categories based at least in part on the topic;
   determining, by the computing system, that the content item corresponds to a first category in the set of categories, based on at least a visual analysis of the content item; and
   associating, by the computing system, the content item with the first category, wherein the content item is included in a page corresponding to the topic and the first category and wherein content items associated with the first category are ordered for presentation in the page based at least in part on one or more social connections associated with a viewing user.

2. The computer-implemented method of claim 1, wherein the topic references one of an entity, a point of interest, a group, an event, a product, or item.

3. The computer-implemented method of claim 1, wherein determining, by the computing system, the topic related to the content item further comprises:
   determining, by the computing system, that the content item is associated with at least one tag that describes the content item; and
   determining, by the computing system, the topic related to the content item based at least in part on the at least one tag.

4. The computer-implemented method of claim 1, wherein determining, by the computing system, the topic related to the content item further comprises:
   determining, by the computing system, that the content item is associated with geolocation data that identifies a geographic location; and determining, by the computing system, the topic related to the content item based at least in part on the geolocation data.

5. The computer-implemented method of claim 1, wherein determining, by the computing system, the topic related to the content item further comprises:
determining, by the computing system, that the content item was captured by a user while being checked-in at a location; and
determining, by the computing system, the topic related to the content item based at least in part on the location at which the user was checked-in.

6. The computer-implemented method of claim 1, wherein determining, by the computing system, the topic related to the content item further comprises:
determining, by the computing system, that the content item was provided through a page that corresponds to the topic.

7. The computer-implemented method of claim 1, wherein determining, by the computing system, that the content item corresponds to the first category further comprises:
evaluating, by the computing system, the content item using one or more content classifiers to determine the first category.

8. The computer-implemented method of claim 1, the method further comprising:
receiving, by the computing system, a request to access the page corresponding to the topic; and
providing, by the computing system, the page corresponding to the topic, wherein the page includes a plurality of content items that are each categorized in a respective category, and wherein the plurality of content items includes the content item categorized in the first category.

9. The computer-implemented method of claim 1, the method further comprising:
determining, by the computing system, that the content item is incorrectly categorized in the first category based at least in part on user feedback; and
removing the association between the content item and the first category.

10. The computer-implemented method of claim 9, the method further comprising:
updating, by the computing system, one or more content classifiers based at least in part on the user feedback.

11. A system comprising:
at least one processor; and
a memory storing instructions that, when executed by the at least one processor, cause the system to perform:
determining a content item to be categorized and a topic related to the content item;
determining a set of categories based at least in part on the topic;
determining that the content item corresponds to a first category in the set of categories, based on at least a visual analysis of the content item; and
associating the content item with the first category, wherein the content item is included in a page corresponding to the topic and the first category and wherein content items associated with the first category are ordered for presentation in the page based at least in part on one or more social connections associated with a viewing user.

12. The system of claim 11, wherein the topic references one of an entity, a point of interest, a group, an event, a product, or item.

13. The system of claim 11, wherein determining the topic related to the content item further causes the system to perform:
determining that the content item is associated with at least one tag that describes the content item; and
determining the topic related to the content item based at least in part on the at least one tag.

14. The system of claim 11, wherein determining the topic related to the content item further causes the system to perform:
determining that the content item is associated with geolocation data that identifies a geographic location; and
determining the topic related to the content item based at least in part on the geolocation data.

15. The system of claim 11, wherein determining the topic related to the content item further causes the system to perform:
determining that the content item was captured by a user while being checked-in at a location; and
determining the topic related to the content item based at least in part on the location at which the user was checked-in.

16. A non-transitory computer-readable storage medium including instructions that, when executed by at least one processor of a computing system, cause the computing system to perform a method comprising:
determining a content item to be categorized and a topic related to the content item;
determining a set of categories based at least in part on the topic;
determining that the content item corresponds to a first category in the set of categories, based on at least a visual analysis of the content item; and
associating the content item with the first category, wherein the content item is included in a page corresponding to the topic and the first category and wherein content items associated with the first category are ordered for presentation in the page based at least in part on one or more social connections associated with a viewing user.

17. The non-transitory computer-readable storage medium of claim 16, wherein the topic references one of an entity, a point of interest, a group, an event, a product, or item.

18. The non-transitory computer-readable storage medium of claim 16, wherein determining the topic related to the content item further causes the computing system to perform:
determining that the content item is associated with at least one tag that describes the content item; and
determining the topic related to the content item based at least in part on the at least one tag.

19. The non-transitory computer-readable storage medium of claim 16, wherein determining the topic related to the content item further causes the computing system to perform:
determining that the content item is associated with geolocation data that identifies a geographic location; and
determining the topic related to the content item based at least in part on the geolocation data.

20. The non-transitory computer-readable storage medium of claim 16, wherein determining the topic related to the content item further causes the computing system to perform:

determining that the content item was captured by a user while being checked-in at a location; and determining the topic related to the content item based at least in part on the location at which the user was checked-in.

\* \* \* \* \*